US011825285B2

United States Patent
Wang et al.

(10) Patent No.: US 11,825,285 B2
(45) Date of Patent: Nov. 21, 2023

(54) SPEAKER DIAPHRAGM AND SPEAKER (71) Applicant: GOERTEK INC., Shandong (CN)

(72) Inventors: Ting Wang, Shangdong (CN); Guodong Zhao, Shandong (CN); Jie Zhu, Shandong (CN); Chun Li, Shandong (CN); Chunfa Liu, Shandong (CN)

(73) Assignee: Goetek Inc., Shandong (CN)

( * ) Notice: Subject to any disclaimer, the term of this patent is extended or adjusted under 35 U.S.C. 154(b) by 519 days.

(21) Appl. No.: 17/252,493

(22) PCT Filed: Oct. 13, 2018

(86) PCT No.: PCT/CN2018/110165
§ 371 (c)(1),
(2) Date: Dec. 15, 2020

(87) PCT Pub. No.: WO2019/237606
PCT Pub. Date: Dec. 19, 2019

(65) Prior Publication Data
US 2021/0274285 A1    Sep. 2, 2021

(30) Foreign Application Priority Data
Jun. 15, 2018 (CN) .......... 201810623917.5

(51) Int. Cl.
*H04R 7/12* (2006.01)
*H04R 9/06* (2006.01)
(Continued)

(52) U.S. Cl.
CPC ............... *H04R 7/125* (2013.01); *B32B 7/12* (2013.01); *B32B 27/08* (2013.01); *B32B 27/36* (2013.01);
(Continued)

(58) Field of Classification Search
CPC .......... B32B 7/12; B32B 27/08; B32B 27/36; B32B 2270/00; B32B 2274/00;
(Continued)

(56) References Cited

U.S. PATENT DOCUMENTS 5,056,617 A    10/1991  Wank et al.
2003/0059606 A1*  3/2003  Iijima .................. C09J 167/025
                                                                428/480
(Continued)

FOREIGN PATENT DOCUMENTS

CN    202652511 U    1/2013
CN    105188000 A    12/2015
(Continued)

OTHER PUBLICATIONS

Translation of CN 101177506 A. Chino et al. (Year: 2008).*

*Primary Examiner* — Brian Ensey
(74) *Attorney, Agent, or Firm* — Baker Botts LLP (57) ABSTRACT

The present disclosure provides a speaker diaphragm and a speaker. The speaker diaphragm comprises a thermoplastic polyester elastomer film layer (11), wherein a thermoplastic polyester elastomer is a copolymer composed of a polyester hard segment A and a polyether or aliphatic polyester soft segment B, and the thermoplastic polyester elastomer film layer has a glass transition temperature being less than or equal to 20° C., and a thermoplastic temperature being 50° C.-200° C. The use of the thermoplastic polyester elastomer film layer enables the speaker diaphragm to have a good flexibility, a high reliability, and a good durability, and improves the anti-destructive ability of the speaker.

16 Claims, 5 Drawing Sheets

(51) Int. Cl.
  *B32B 7/12* (2006.01)
  *B32B 27/08* (2006.01)
  *B32B 27/36* (2006.01)
  *H04R 9/02* (2006.01)
  *H04R 7/18* (2006.01)

(52) U.S. Cl.
  CPC ............. *H04R 9/025* (2013.01); *H04R 9/06* (2013.01); *B32B 2270/00* (2013.01); *B32B 2274/00* (2013.01); *B32B 2307/51* (2013.01); *B32B 2307/54* (2013.01); *H04R 7/18* (2013.01); *H04R 2307/025* (2013.01)

(58) Field of Classification Search
  CPC ........... B32B 2307/51; B32B 2307/54; B32B 2250/03; B32B 2250/244; B32B 2250/02; B32B 2307/30; B32B 25/20; B32B 2307/102; B32B 2307/732; B32B 25/08; B32B 33/00; B32B 2307/748; B32B 2457/00; B32B 2307/10; B32B 2307/558; H04R 7/125; H04R 9/025; H04R 9/06; H04R 7/18; H04R 2307/025
  See application file for complete search history.

(56) References Cited

U.S. PATENT DOCUMENTS

2011/0026757 A1* 2/2011 Takahashi ............ H04R 31/003
                                                                    381/397
2013/0259291 A1 10/2013 Fujitani et al.

FOREIGN PATENT DOCUMENTS

| | | |
|---|---|---|
| CN | 105933831 A | 9/2016 |
| CN | 108551640 A | 9/2018 |
| CN | 108551641 A | 9/2018 |
| CN | 108551642 A | 9/2018 |
| CN | 108566608 A | 9/2018 |
| CN | 108851643 A | 9/2018 |
| CN | 108668205 A | 10/2018 |
| CN | 108966088 A | 12/2018 |
| CN | 109005487 A | 12/2018 |
| EP | 0 360 061 A3 | 12/1991 |

* cited by examiner

SPEAKER DIAPHRAGM AND SPEAKER

CROSS-REFERENCE TO RELATED APPLICATION

This application is a National Stage of International Application No. PCT/CN2018/110165, filed on Oct. 13, 2018, which claims priority to Chinese Patent Application No. 201810623917.5, filed on Jun. 15, 2018, both of which are hereby incorporated by reference in its entirety.

TECHNICAL FIELD

The present invention relates to the technical field of electro-acoustic conversion, and more specifically to a speaker diaphragm and a speaker.

BACKGROUND

Existing speaker diaphragms mostly adopt a composite structure of high modulus plastic film layers (PEEK, PAR, PEL, PI, etc.), soft thermoplastic polyurethane elastomer (TPU) and damping film (acrylic glue, silica gel, etc.). However, the overall performance of the above-mentioned diaphragm is poor, which is likely to cause poor sound quality.

With the increasing requirements for high power, waterproof and high sound quality, the diaphragm made from silicone rubber has also been applied in the technical field of speakers. However, the silicone rubber is relatively low in modulus or hardness. Under the premise of meeting the same $F_0$ requirement, the diaphragm is relatively thick. This leads to on one hand a reduced space allowance for vibration and on the other hand a heavy weight of the vibration system, resulting in a low sensitivity.

Therefore, it is necessary to provide a new technical solution to solve the above technical problems.

SUMMARY

An object of the present invention is to provide a new technical solution for a speaker diaphragm. According to the first aspect of the present invention, a speaker diaphragm is provided. The speaker diaphragm comprises a thermoplastic polyester elastomer film layer, wherein a thermoplastic polyester elastomer is a copolymer composed of a polyester hard segment A and a polyether or aliphatic polyester soft segment B, and the thermoplastic polyester elastomer film layer has a glass transition temperature being less than or equal to 20° C., and a thermoplastic temperature being 50° C.-200° C.

Optionally, an elastic recovery rate of the thermoplastic polyester elastomer film layer after 10% strain is greater than or equal to 80%.

Optionally, a percentage of breaking elongation of the thermoplastic polyester elastomer film layer is greater than or equal to 300%.

Optionally, the thermoplastic polyester elastomer film layer has a Young's modulus being 1-1000 MPa.

Optionally, a loss factor of the thermoplastic polyester elastomer film layer is greater than or equal to 0.015.

Optionally, a thickness of the thermoplastic polyester elastomer film layer is 5-40 μm.

Optionally, a glass transition temperature of the thermoplastic polyester elastomer film layer is −90° C.-0° C.

Optionally, a thermoplastic polyester elastomer is a copolymer composed of a polyester hard segment A and a polyether or aliphatic polyester soft segment B; a mass percentage of the polyester hard segment A is 10-95%, and a relative molecular mass of the polyether or aliphatic polyester soft segment B is 600-6000.

Optionally, a material of the polyether or aliphatic polyester soft segment B is selected from one or more of aliphatic polyester, polytetrahydrofuran ether, polyphenylene ether, and polyethylene oxide; and a material of the polyester hard segment A is a polymer of dibasic acid and dihydric alcohol, wherein the dibasic acid is selected from one or more of terephthalic acid, isophthalic acid, naphthalenedicarboxylic acid and biphenyldicarboxylic acid, and the dihydric alcohol is selected from one or more of ethylene glycol, propylene glycol, butylene glycol, pentanediol, and hexylene glycol.

Optionally, the polyester hard segment A can be crystallized, an average polymerization degree of the polyester hard segment A material is ≥2, and a melting temperature of the polyester hard segment A is ≥150° C.

Optionally, the diaphragm further comprises two surface layers compounded together and at least one intermediate layer located between the two surface layers, and at least one of the surface layers is the thermoplastic polyester elastomer film layer, and at least one of the intermediate layers is an adhesive layer.

Optionally, the speaker diaphragm is of a three-layer structure, comprising one intermediate layer, and two surface layers being the thermoplastic polyester elastomer film layers.

Optionally, the speaker diaphragm comprises two intermediate layers, the two surface layers being the thermoplastic polyester elastomer film layers, and the two intermediate layers being the adhesive layers of different materials.

Optionally, the speaker diaphragm comprises three intermediate layers, wherein two of the intermediate layers are adhesive layers and the other intermediate layer is the thermoplastic polyester elastomer film layer, and the thermoplastic polyester elastomer film layer is located between the two adhesive layers; or The three intermediate layers are all adhesive layers.

According to the second aspect of the present invention, a speaker is provided. The speaker comprises a vibration system and a magnetic circuit system cooperating with the vibration system, wherein the vibration system comprises the above speaker diaphragm.

According to an embodiment of the present disclosure, the speaker diaphragm features high structural strength, is not easy to be damaged, has a good toughness and resilience and a good sound generation effect.

Other features and advantages of the invention will become clear from the following detailed description of exemplary embodiments of the invention with reference to the drawings.

BRIEF DESCRIPTION OF THE DRAWINGS

The drawings incorporated in the specification and constituting a part of the specification illustrate the embodiments of the present invention, and together with the description are used to explain the principle of the present invention.

DRAWING REFERENCE SIGNS

11: thermoplastic polyester elastomer film layer; 12: adhesive layer; 12a: another adhesive layer; 13: central portion; 14: FPCB; 16: connecting portion; 17: corrugated rim.

DETAILED DESCRIPTION

Various exemplary embodiments of the invention will now be described in detail with reference to the drawings. It should be noted that: unless specifically stated otherwise, the relative arrangement of components and steps, numerical expressions, and numerical values set forth in these embodiments do not limit the scope of the invention.

The following description of at least one exemplary embodiment is actually merely illustrative, and in no way serves as any limitation on the invention and its application or use.

The technologies, methods, and devices known to those of ordinary skill in the relevant fields may not be discussed in detail, but where appropriate, the technologies, methods, and devices should be regarded as part of the specification.

In all examples shown and discussed herein, any specific values should be interpreted as exemplary only and not as limitations. Therefore, other examples of the exemplary embodiment may have different values.

It should be noted that similar reference numerals and letters indicate similar items in the following drawings, so once an item is defined in one drawing, it does not need to be further discussed in the subsequent drawings.

According to an embodiment of the present invention, a speaker diaphragm is provided. The diaphragm can be a single-layer structure or a composite structure composed of a plurality of film layers.

The diaphragm includes a thermoplastic polyester elastomer film layer. The thermoplastic polyester elastomer is a copolymer composed of a polyester hard segment A and a polyether or aliphatic polyester soft segment B.

Specifically, the polyester material and the polyether or aliphatic polyester material undergo a transesterification reaction to generate a copolymer under the action of a set catalyst. Copolymer is a polymer prepared by linking two or more polymer chain segments with different properties together. Due to the inherent incompatibility between the various components of the copolymer, it self-assembles into an ordered nanostructure in a nanometer scale, and the resulting microphase is separated, exhibiting the characteristics of having the properties of different polymer chain segments.

For example, the copolymer raw materials used to make the diaphragm are granular, powdery, etc. When making the diaphragm, the raw material is heated and turned into a fluid. With the fluid, the film layer is formed by injection molding, tape casting, etc.

The polyester hard segment A has higher hardness and plays a role of structural support, which makes the thermoplastic polyester elastomer film layer have sufficient stiffness. The polyether or aliphatic polyester soft segment B has strong fluidity and provides compliance for the film layer, such that the thermoplastic polyester elastomer film layer has a good resilience and a low thermoplastic temperature, for example, which can reach 50° C.-200° C., the molding temperature of the speaker diaphragm is low, and the processing is easier.

The higher the mass fraction of the polyester hard segment A, the higher the hardness of the formed speaker diaphragm, but the brittleness of the speaker diaphragm increases and is easy to break. By contrast, the lower the mass fraction of the polyester hard segment A, the more difficult for the polyester hard segment A to form crystals, causing the thermoplastic polyester elastomer film layer to have a soft texture and low hardness, this leads to soft texture and low hardness of the thermoplastic polyester elastomer film and deteriorated toughness and resilience of the speaker diaphragm.

In one example, the mass percentage of the material of the polyester hard segment A, that is the percentage of the amount of hard segment A of polyester material in the total mass of the hard segment A of polyester material and the aliphatic polyester soft segment B material (total mass of reactants) is 10-95%. This range allows the speaker diaphragm to have hardness, toughness and resilience performance.

Preferably, the mass percentage of the material of the polyester hard segment A is 30-90%. Within this range, the thickness of the speaker diaphragm can be made thinner, and the hardness, toughness, and resilience performance are better.

Optionally, a material of the polyester hard segment A is a polymer of dibasic acid and dihydric alcohol. The dibasic acid and the dihydric alcohol undergo apolymerization reaction under the set reaction conditions to form the polyester hard segment A. The polymer easily reacts with the material of the polyether or aliphatic polyester soft segment B to form a thermoplastic elastomer polymer.

For example, the dibasic acid is selected from one or more of terephthalic acid, isophthalic acid, naphthalenedicarboxylic acid and biphenyldicarboxylic acid. The above-mentioned dibasic acid and the dihydric alcohol have a fast reaction speed and a high conversion rate.

For example, the dihydric alcohol is selected from one or more of ethylene glycol, propylene glycol, butylene glycol, pentanediol, and hexylene glycol. The above-mentioned dibasic acid and the dihydric alcohol have a fast reaction speed and a high conversion rate.

Of course, the types of dibasic acids and dihydric alcohol are not limited to the foregoing embodiments, and can be selected by those skilled in the art according to actual needs.

In one example, the polyester hard segment A can be crystallized, and the average polymerization degree of the polyester hard segment A material is ≥2. With this average polymerization degree, the polyester hard segment A has a good crystallization property, causing the speaker diaphragm to have a high stiffness, high structural strength, and good durability.

In one example, the melting temperature of the polyester hard segment A is ≥150° C. The melting temperature refers to a temperature at which a material changes from a solid phase to a liquid phase. The melting temperature of the polyester hard segment A determines the melting temperature of the thermoplastic polyester elastomer. The higher the melting temperature, the wider the use temperature range of the thermoplastic polyester elastomer. The melting temperature range makes the application temperature range of the speaker diaphragm wider, which can work normally in a higher temperature working environment.

Optionally, the material of the polyether or aliphatic polyester soft segment B is made from a material selected from one or more of aliphatic polyester, polyethylene oxide, polypropylene oxide, polytetrahydrofuran ether and polyphenylene ether. This enables excellent fluidity of the thermoplastic polyester elastomer and good compliance and flexibility of the speaker diaphragm.

In addition, the above-mentioned materials are easy to polymerize with the material of the polyester hard segment A, such that the processing of the speaker diaphragm becomes easy.

Optionally, the relative molecular mass of the material of the polyether or aliphatic polyester soft segment B is 600-6000. The lower the relative molecular mass of the polyether or aliphatic polyester soft segment B, the more severe it is dispersed by the polyester hard segment A, thus the diaphragm exhibits higher brittleness, and the diaphragm has poor toughness and resilience. The higher the relative molecular mass of the polyether or aliphatic polyester soft segment B, the higher the hardness, and its properties are getting closer and closer to the polyester hard segment A, which makes the elasticity of the speaker diaphragm worse and the percentage of breaking elongation smaller. The range of the relative molecular mass enables the speaker diaphragm to have both the sufficient stiffness and toughness, and the higher tensile strength and greater elongation of broken chain.

In one example, the thickness of the thermoplastic polyester elastomer film layer is 5-70 μm. The smaller the thickness of the thermoplastic polyester elastomer, the less the stiffness of the speaker diaphragm, thus the polarization is likely to occur during vibration. On the contrary, the larger the thickness, the smaller the space allowance for vibration of the formed vibration system, and meanwhile the weight of the vibration system increases, and the sensitivity of the formed vibration system becomes worse. This thickness range enables the speaker diaphragm to have both higher stiffness and sensitivity, and enlarges the space allowance for vibration of the vibration system.

Furthermore, the thickness of the thermoplastic polyester elastomer film layer is 5-40 μm. This thickness range makes the speaker diaphragm have a higher sensitivity, and makes likewise the driving power diaphragm have a large amplitude and great loudness, and makes the space allowance for vibration of the vibration system larger.

In addition to providing stiffness in the speaker diaphragm, the thermoplastic polyester elastomer film layer can also provide part of the damping performance. This is because the thermoplastic polyester elastomer film layer is composed of the polyester hard segment A and the polyether or aliphatic polyester soft segment B, the molecular chain segments of polyether or aliphatic polyester soft segment B can move at room temperature, but the presence of the polyester hard segment A makes the frictional damping of the molecular chain segment movement large, thus exhibiting good damping characteristics.

The loss factor can characterize the damping amount of the material, and the loss factor of the thermoplastic polyester elastomer film layer is ≥0.015. This shows that the damping of the speaker diaphragm is improved, the vibration system has a strong ability to suppress the polarization phenomenon during the vibration process, and the vibration consistency is good. The commonly used engineering plastic film layer has low damping with a loss factor generally less than 0.01, and the damping is smaller.

Compared with engineering plastics, the thermoplastic polyester elastomer film layer makes the speaker diaphragm have a wider elastic area and have a good resilience. In one example, the elastic recovery rate of the thermoplastic polyester elastomer film layer after 10% strain is ≥80%. Due to the good resilience of the speaker diaphragm, the speaker has a better transient response and a lower distortion.

Commonly used engineering plastic diaphragms, such as PEEK, have a yield point of about 5%, while the thermoplastic polyester elastomer is in a highly elastic state at room temperature, so it has good resilience, and the material will not yield significantly when stressed, and there is no yield point or the yield point is >10%.

Figure 8:
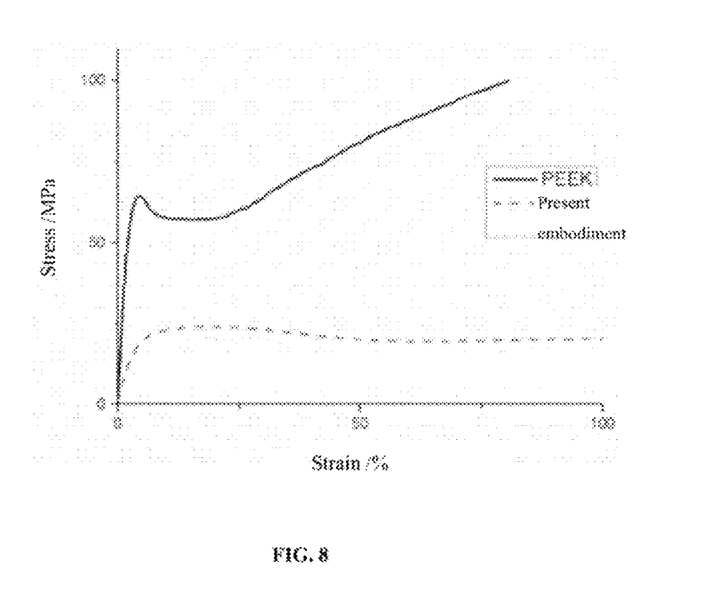
FIG. 8 is a stress-strain curve of a speaker diaphragm according to an embodiment of the present invention and a PEEK diaphragm.

FIG. 8 shows a stress-strain curve of a speaker diaphragm according to an embodiment of the present invention and a PEEK diaphragm.

Wherein, the dotted line is the stress-strain curve of the speaker diaphragm provided by the embodiment of the present invention; the solid line is the stress-strain curve of the PEEK diaphragm.

It can be seen from FIG. 8 that under the same stress, the strain of the speaker diaphragm provided by the embodiment of the present invention is significantly greater than that of the PEEK diaphragm. This indicates that the Young's modulus of the speaker diaphragm provided by the embodiment of the present invention is significantly smaller than that of the PEEK diaphragm.

In addition, the PEEK diaphragm has an obvious yield point, which is about 0.4-0.5% strain. However, the speaker diaphragm provided by the present invention has no obvious yield point. The strain at yield is >10%. This shows that the speaker diaphragm provided by the present invention has a wider elastic area and has excellent resilience performance.

The thermoplastic polyester elastomer film layer makes the speaker diaphragm have good flexibility, and for example, the percentage of breaking elongation is ≥300%. The materials of the polyester hard segment A and the polyether or aliphatic polyester soft segment B have an important influence on the percentage of breaking elongation, and may be selected by those skilled in the art according to actual needs. This makes the vibration displacement of the speaker diaphragm larger and the loudness greater. And the reliability and durability are good. The better the flexibility of the material, the greater the percentage of breaking elongation, and the stronger the ability of the speaker diaphragm to resist damage. When the speaker diaphragm is vibrating in a state of large amplitude, the material has a relatively large strain, and there is a risk of folding the diaphragm, cracking the diaphragm or damaging the diaphragm during long-term vibration. The speaker diaphragm with the thermoplastic polyester elastomer film layer as the base material has a good flexibility, which reduces the risk of damaging the diaphragm.

The glass transition temperature of the thermoplastic polyester elastomer film layer can be adjusted by adjusting the ratio of the polyester hard segment A material to the polyether or aliphatic polyester soft segment B material. For example, the mass percentage of polyester hard segment A is 10-95%. This makes the glass transition temperature of the thermoplastic polyester elastomer film layer ≤20° C. The glass transition temperature enables the speaker diaphragm to maintain a high elastic state at normal temperature and have a good resilience.

Preferably, the glass transition temperature of the thermoplastic polyester elastomer film layer is −90° C.-0° C. This allows the speaker diaphragm to always maintain better rubber elasticity when working below 0° C., such that the speaker exhibits a higher sound quality. In the meanwhile, the risk of damaging the speaker diaphragm in a low temperature environment is reduced, and the reliability is higher.

The speaker diaphragm of the embodiment of the present invention can meet the needs of the speaker for use in high and low temperature environments. Its performance is more outstanding than that of the conventional diaphragm (such as PEEK diaphragm) at low temperatures. When used in a low-temperature environment, the diaphragm of the embodiment of the present invention still has good strength and toughness, and the risk of breaking the diaphragm is low in a long-term low-temperature environment.

In one example, the Young's modulus of the thermoplastic polyester elastomer film layer is 1-1000 MPa. In certain conditions, the Young's modulus is proportional to the $F_0$ (resonant frequency) of the speaker. The thermoplastic polyester elastomer film layer makes the Young's modulus of the speaker lower, thereby acquiring a lower $F_0$, and thus improving the low-frequency effect of the speaker.

The speaker diaphragm has a low Young's modulus and good thermal plasticity, which allows the speaker diaphragm to be made very thin, thereby reducing the mass of the speaker diaphragm, improving the space allowance for vibration, improving the sensitivity, and making the $F_0$ of the speaker lower.

The speaker diaphragm has a wider elastic area and an excellent resilience performance.

Further, the Young's modulus of the thermoplastic polyester elastomer film layer is 2-700 MPa. As such, the $F_0$ of the speaker can be further reduced. Those skilled in the art can adjust the types, proportions and the like of the polyester hard segment A material and the polyether or aliphatic polyester soft segment B material according to the sound generation requirements of different speaker diaphragms to achieve a suitable Young's modulus.

In one example, the speaker diaphragm is a composite structure. The composite structure includes two surface layers compounded together and at least one intermediate layer located between the two surface layers. At least one surface layer is a thermoplastic polyester elastomer film layer, and at least one intermediate layer is an adhesive layer.

The adhesive layer provides the damping and adhesion properties required by the speaker diaphragm. The adhesive layer can be directly bonded with the thermoplastic polyester elastomer film layer to form a composite structure. This makes the production of the speaker diaphragm very easy.

The loss factor can reflect the magnitude of damping amount. In one example, the loss factor of the adhesive layer is ≥0.1. The adhesive layer can effectively suppress the polarization of the needle-shaped system when it vibrates, such that the vibration consistency becomes better, thereby improving the hearing effect.

In one example, the adhesive force between the adhesive layer and the thermoplastic polyester elastomer film layer is greater than 100 g/25 mm (180° peeling). The high adhesive force makes the upper and lower film layers of the adhesive layer have a good coordination and consistency during the vibration process, and the sound quality is pure, and the speaker diaphragm still maintains the original state after long-term vibration, and the performance stability is high.

Optionally, the adhesive layer is selected from one or more of acrylic adhesives, silicone adhesives and polyurethane adhesives. The above-mentioned adhesives have good adhesion and damping properties. Those skilled in the art can make selections according to actual needs.

In this example, the thickness of the adhesive layer is 1-40 μm, and the adhesive force of the adhesive layer increases as the thickness of the adhesive layer increases. If the thickness is too small, the adhesive force will be insufficient, and the consistency of the movement of the upper and lower surface layers of the adhesive layer cannot be effectively guaranteed during the vibration process, in the meanwhile, the damping effect provided by the adhesive layer will also decrease as the thickness decreases. The thickness of the adhesive layer is too large, thus on one hand reducing the space allowance for vibration, and on the other hand making the edge of the speaker diaphragm prone to problems such as glue overflow which affects the process yield. The adhesive layer in this thickness range can take into account sufficient adhesive force, excellent damping effect and sufficient space allowance for vibration for the vibration system. Further preferably, the thickness of the adhesive layer is 2-35 μm.

Preferably, the thickness of the speaker diaphragm is 10-100 μm. This thickness range enables the vibration system to have sufficient space allowance for vibration, and is conducive to the thin and miniaturized design of the speaker.

Figure 2:
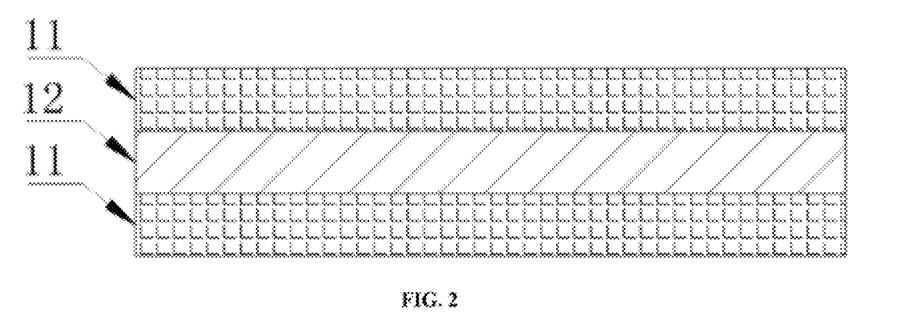
FIGS. 2-4 are cross-sectional views of a speaker diaphragm according to an embodiment of the present invention.

In one example, as shown in FIG. 2, the speaker diaphragm has a three-layer structure, which includes an intermediate layer. The intermediate layer is the adhesive layer 12. The two surface layers are thermoplastic polyester elastomer film layers 11. The speaker diaphragm has a strong stiffness and a good damping effect.

In addition, the speaker diaphragm has fewer layers, can be made thinner, and has higher vibration sensitivity.

In one example, the surface layers are thermoplastic polyester elastomer film layers 11. This makes the hardness, toughness and resilience of the speaker diaphragm better. Since the materials of the two surface layers of the diaphragm are uniform, the durability of the diaphragm is more excellent.

Figure 3:
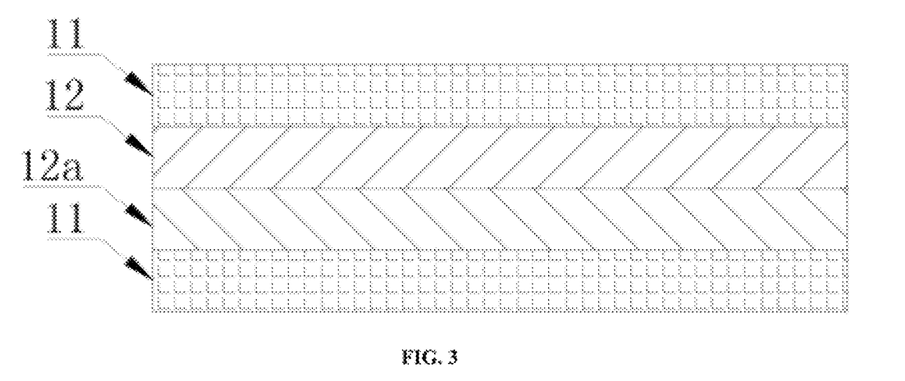

In one example, the speaker diaphragm includes two intermediate layers. The two surface layers are thermoplastic polyester elastomer film layers 11. Wherein, the two intermediate layers are adhesive layers 12, 12a of different materials, as shown in FIG. 3.

The speaker diaphragm has a strong stiffness and a good damping effect.

Figure 4:
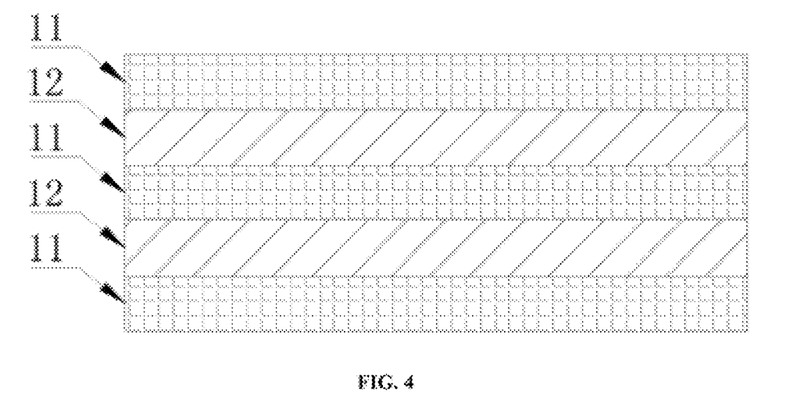

In one example, the speaker diaphragm includes three intermediate layers. The two surface layers are thermoplastic polyester elastomer film layers 11. As shown in FIG. 4, the two intermediate layers are adhesive layers 12, the other intermediate layer is a thermoplastic polyester elastomer film layer 11, and the thermoplastic polyester elastomer film layer 11 is located between the two adhesive layers 12. The thermoplastic polyester elastomer film layer 11 and the adhesive layer 12 are alternately arranged with each other.

The three intermediate layers are adhesive layers 12.

The speaker diaphragm has a strong stiffness, a good damping effect and a good resilience.

Optionally, the Young's modulus of a plurality of thermoplastic polyester elastomer film layers may be the same or different. Wherein, when the Young's modulus is the same, the vibration consistency of all the thermoplastic polyester elastomer film layers is better. When the Young's modulus is different, the difficulty of up and down vibration of the speaker diaphragm can be adapted by adjusting the Young's modulus to optimize the vibration balance.

In addition, the loss factors and thicknesses of a plurality of thermoplastic polyester elastomer film layers and adhesive layers may be the same or different. Those skilled in the art can adjust the stiffness, damping characteristics, compliance, resilience, etc. of the speaker diaphragm by adjusting the above parameters.

Preferably, the thickness of the two surface layers is the same, which makes the speaker diaphragm have a good uniformity and not easy to curl or wrinkle.

When the thermoplastic polyester elastomer mold layer is compounded with the adhesive layer, the Young's modulus of the formed speaker diaphragm will change accordingly. The smaller Young's modulus of the adhesive layer will reduce the Young's modulus of the speaker diaphragm. For example, the Young's modulus of the thermoplastic polyester elastomer film layer is 1-1000 MPa, and the Young's modulus of the compounded speaker diaphragm is 5-600 MPa.

In other examples, one of the two surface layers is a thermoplastic polyester elastomer film layer, and the other is other materials film layer, such as a silicone rubber layer, an engineering plastic layer, and the like. A plurality of film layers are bonded together through the adhesive layer. As such, the speaker diaphragm also has the good physical and acoustic properties.

Figure 7:
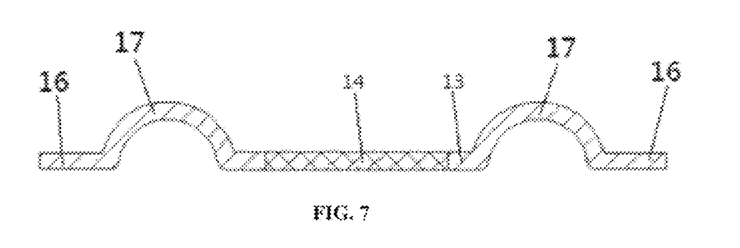
FIG. 7 is a cross-sectional view of a speaker diaphragm according to an embodiment of the present invention.

In one example, as shown in FIG. 7, the speaker diaphragm is a corrugated ring diaphragm, which includes a corrugated rim 17, a central portion 13 formed by the inner edge of the corrugated rim 17 extending inwardly, and a connecting portion 16 formed by the outer edge of the corrugated rim 17 extending outward. For example, a reinforcing layer is provided in the central portion 13, which can increase the structural strength of the speaker diaphragm and reduce the split vibration of the speaker diaphragm. One end of the voice coil is connected to the central portion 13. The connecting portion 16 is used to connect with the housing of the speaker. The thickness of the corrugated rim 17 is configured to gradually increase from the apex to a portion close to the central portion 13 and the connecting portion 16.

The apex is the highest point or the lowest point of the cross section of the corrugated rim 17 in the radial direction. In this way, since the thickness near the apex is smaller, the vibration sensitivity of the speaker diaphragm is higher. Since the thickness of the portion close to the central portion 13 and the connecting portion 16 is large, the structural strength of the diaphragm can be improved.

In one example, as shown in FIG. 7, the reinforcing layer is FPCB 14. The FPCB 14 is embedded in the central portion 13. The FPCB 14 includes a conductive metal layer and an insulating layer covering the upper and lower sides of the conductive metal layer. The conductive metal layer makes the FPCB 14 have a high strength, and the insulating layer makes the FPCB 14 have a strong toughness. FPCB 14 can effectively reduce the split vibration of the speaker diaphragm.

In addition, the wire-out end and the wire-in end of the voice coil are connected to the FPCB 14, and conducted with the external circuit through the FPCB 14. This method makes the electrical connection of the voice coil easier and has high reliability.

Figure 1A:
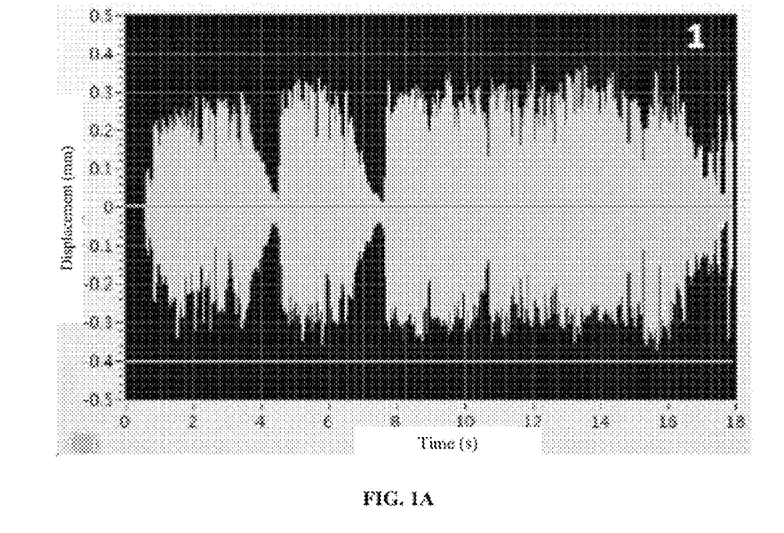
FIG. 1A is a SmartPA (smart power amplifier) test curve of a conventional diaphragm.
Figure 1B:
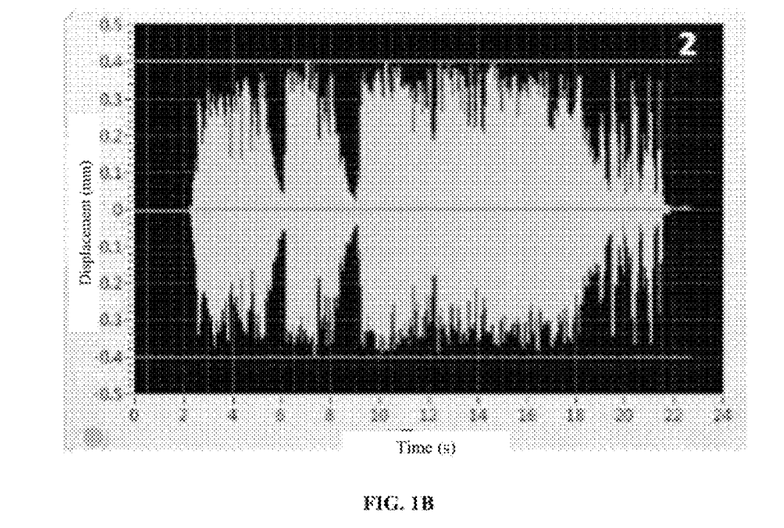
FIG. 1B is a SmartPA test curve of a speaker diaphragm according to an embodiment of the present invention.

FIG. 1A is a SmartPA (smart power amplifier) test curve of the conventional diaphragm. FIG. 1B is a SmartPA test curve of a speaker diaphragm according to an embodiment of the present invention.

Wherein, the abscissa is the test time (s), and the ordinate is the displacement (mm).

It should be noted that, in the embodiment of the present invention, the structure of the conventional diaphragm is the same as the structure of the diaphragm in the embodiment of the present invention, and its material is different from that of the diaphragm in the embodiment of the present invention. For example, the conventional diaphragm and the diaphragm in the embodiment of the present invention are three-layer structures, and the conventional diaphragm includes two PEEK surface layers and an adhesive layer located between the two surface layers. The diaphragm of the embodiment of the present invention is also a three-layer structure, including two thermoplastic polyester elastomer surface layers and an adhesive layer located between the two surface layers. The thicknesses and structures of the corresponding adhesive layers of the two diaphragms are the same. The voice coils and the magnetic circuit systems connected with the two diaphragms are the same. The conventional diaphragm structure and the diaphragm structure of the present invention for comparison in the following embodiments adopt the same structure as the embodiment, and will not be repeated.

When the electrical audio signal is input to the speaker, according to F=BIL, it can be known that when the design of the voice coil and the magnetic circuit system is fixed (the BL value is fixed), the voice coil is subjected to the same force of the electromagnetic field. Therefore, the driving force from the voice coil to the diaphragm is the same.

However, since the Young's modulus of PEEK is much greater than that of the diaphragm of the embodiment of the present invention, the diaphragm of the embodiment of the present invention is more prone to elastic deformation under the same force, so as to achieve the desired displacement. It can be seen from the SmartPA test curves of the two diaphragms that when the same music is played, the diaphragm of the embodiment of the present invention has a greater displacement during the vibration process, and thus the acquired loudness is also greater.

Figure 5:
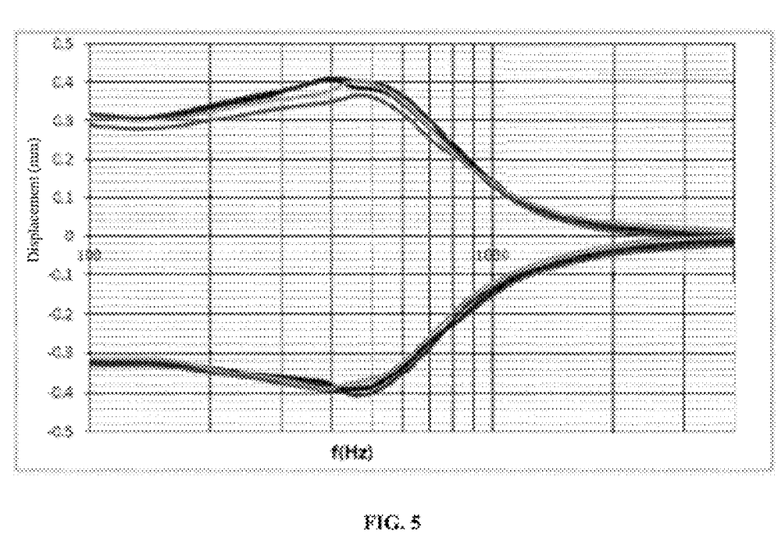
FIG. 5 is a test curve of the vibration displacements of different parts of a speaker diaphragm according to an embodiment of the present invention at different frequencies.
Figure 6:
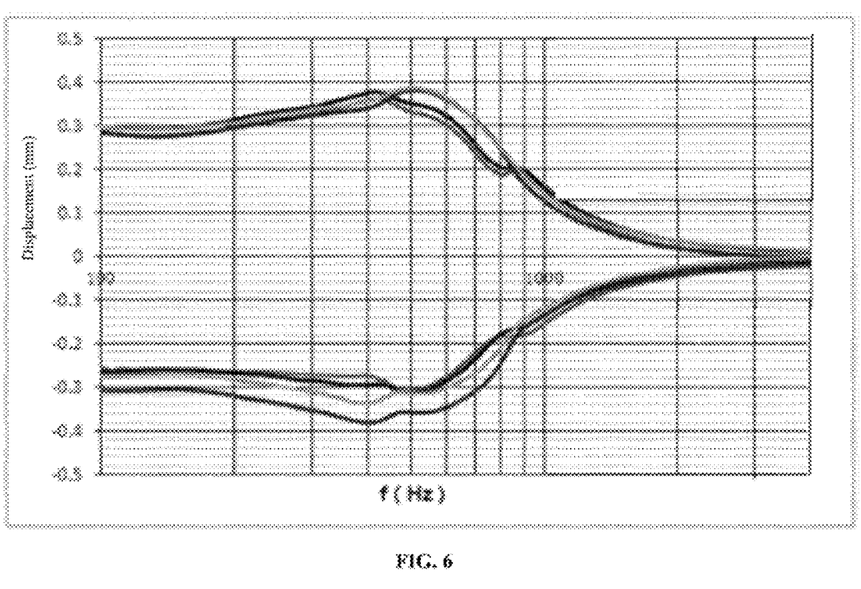
FIG. 6 is a test curve of the vibration displacements of different parts of a conventional diaphragm at different frequencies.

FIG. 5 is a test curve of the vibration displacements of different parts of the speaker diaphragm according to an embodiment of the present invention at different frequencies. FIG. 6 is a test curve of the vibration displacements of different parts of the conventional diaphragm at different frequencies.

Wherein, the diaphragm is a rectangular corrugated ring diaphragm. The abscissa is the frequency (Hz), and the ordinate is the loudness displacement (mm). The test is performed at the edge position and the center position of the central portion of the diaphragm.

It can be seen that the curves in FIG. 5 are more concentrated, while the curves in FIG. 6 are more dispersed. This shows that the vibration consistency of all parts of the speaker diaphragm of the embodiment of the present invention is better, and during the vibration process, the swing of the diaphragm is really less, and the sound quality and hearing stability are better.

Figure 9:
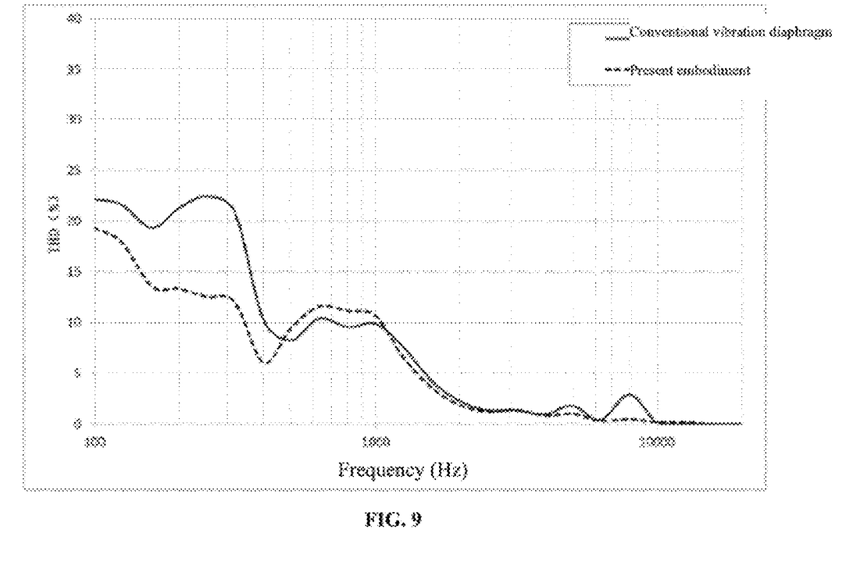
FIG. 9 is a test curve of harmonic distortion between a speaker diaphragm according to an embodiment of the present invention and a conventional diaphragm.

FIG. 9 is a test curve of total harmonic distortion between a speaker diaphragm according to an embodiment of the present invention and a conventional diaphragm. The diaphragm is a corrugated ring diaphragm. The abscissa is the frequency (Hz), and the ordinate is the total harmonic distortion THD (%).

Wherein, the dotted line is the test curve of total harmonic distortion of the speaker diaphragm provided by the embodiment of the present invention. The solid line is the test curve of total harmonic distortion of the conventional PEEK diaphragm.

It can be seen from FIG. 9 that the speaker diaphragm of the embodiment of the present invention has a lower THD (total harmonic distortion) compared to the PEEK diaphragm, and has no spikes and the like. This shows that the speaker diaphragm of the embodiment of the present invention has a better anti-polarization ability and a better sound quality.

Figure 10:
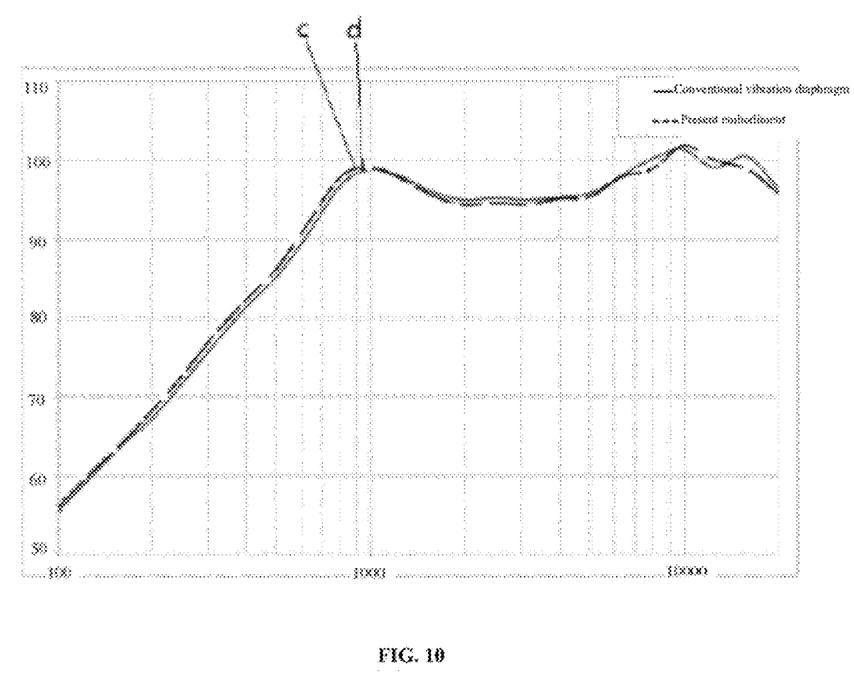
FIG. 10 is a test curve of loudness (SPL curve) of a speaker diaphragm according to an embodiment of the present invention and a conventional diaphragm at different frequencies.

FIG. 10 is a test curve of loudness (SPL curve) of a speaker diaphragm according to an embodiment of the present invention and a conventional diaphragm at different frequencies. The diaphragm is a corrugated ring diaphragm. The abscissa is the frequency (Hz), and the ordinate is the loudness.

Wherein, the dotted line is the test curve of the speaker diaphragm provided by the embodiment of the present invention. The solid line is the test curve of the conventional PEEK diaphragm.

It can be seen from the SPL curve in FIG. 10 that the mid-frequency performances of the two speaker diaphragms are similar. The $F_0$ of the speaker using the diaphragm of the embodiment of the present invention is 815 Hz, at c in FIG. 10, and the $F_0$ of the speaker using PEEK diaphragm is 860 Hz, at d in FIG. 10. This shows that the low frequency sensitivity of the speaker diaphragm of the embodiment of the present invention is higher than that of the PEEK diaphragm. In other words, the speaker adopting the speaker diaphragm of the embodiment of the present invention has higher loudness and comfort level.

According to another embodiment of the present invention, a speaker is provided. The speaker includes a vibration system and a magnetic circuit system that cooperates with the vibration system. The vibration system includes the speaker diaphragm provided by the present invention. For example, the diaphragm is a corrugated ring diaphragm or a flat plate diaphragm. The speaker has the characteristics of good sound generation effect and good durability.

The $F_0$ of the speaker is proportional to the Young's modulus and thickness. The $F_0$ can be changed by changing the thickness and Young's modulus of the speaker diaphragm. The specific adjustment principle is as follows:

$$F0 = \frac{1}{2\pi}\sqrt{\frac{1}{CmsMms}}$$

wherein, Mms is the equivalent vibration quality of the speaker, and Cms is the equivalent compliance of the speaker:

$$Cms = \frac{(C_{m1} * C_{m2})}{(C_{m1} + C_{m2})}$$

wherein, Cms1 is the damper compliance, and Cms2 is the diaphragm compliance. When designing without damper, the equivalent compliance of the speaker is the diaphragm compliance:

$$C_{m2} = \frac{(1-u^3)W^3}{\pi(W+dvc)t^3Ea_1a_2}$$

wherein, w is the total width of the corrugated rim of the diaphragm, t is the thickness of the diaphragm; dvc is the fitting outer diameter of the diaphragm voice coil; E is the Young's modulus of the diaphragm material; u is the Poisson's ratio of the diaphragm material.

It can be seen that the $F_0$ of the speaker is proportional to the modulus and thickness. In order to acquire full bass and comfortable listening, the diaphragm should have sufficient stiffness and damping while the speaker has a lower $F_0$. Those skilled in the art can adjust the size of $F_0$ by adjusting the Young's modulus and thickness of the speaker diaphragm. Preferably, the Young's modulus is 5-600 MPa. The thickness of the speaker diaphragm is 10-100 μm. This enables the $F_0$ of the speaker to reach 150-1500 Hz. The low frequency performance of the speaker is excellent.

Preferably, the amplitude of the speaker diaphragm is 0.25 mm-1.0 mm, and the "amplitude" described in this embodiment refers to the unidirectional maximum value of the diaphragm deviation from the balance position. The speaker diaphragm containing the thermoplastic polyester elastomer film layer still has a good hearing effect in this vibration range. However, the amplitude of engineering plastic films, such as PEEK film, generally cannot reach the above-mentioned range, and even if it can reach the above-mentioned range, a good hearing effect cannot be achieved.

Further, the amplitude of the speaker diaphragm is 0.4 mm-0.6 mm. This range enables the vibration system to achieve a better listening effect and have a sufficient space allowance for vibration.

Although some specific embodiments of the present invention have been described in detail through examples, those skilled in the art should understand that the above examples are only for illustration and not for limiting the scope of the present invention. It should be understood by a person skilled in the art that the above embodiments can be modified without departing from the scope and spirit of the present invention. The scope of the present invention is defined by the attached claims.

The invention claimed is:

1. A speaker diaphragm, comprising a thermoplastic polyester elastomer film layer comprising a copolymer including a polyester hard segment A and a polyether or aliphatic polyester soft segment B, wherein the thermoplastic polyester elastomer film layer has a glass transition temperature being less than or equal to 20° C., and a thermoplastic temperature being 50° C.-200° C.

2. The speaker diaphragm according to claim 1, wherein the thermoplastic polyester elastomer film layer has an elastic recovery rate after 10% strain greater than or equal to 80%.

3. The speaker diaphragm according to claim 1, wherein a the thermoplastic polyester elastomer film layer has a percentage of breaking elongation greater than or equal to 300%.

4. The speaker diaphragm according to claim 1, wherein the thermoplastic polyester elastomer film layer has a Young's modulus of 1-1000 MPa.

5. The speaker diaphragm according to claim 1, wherein the thermoplastic polyester elastomer film layer has a loss factor greater than or equal to 0.015.

6. The speaker diaphragm according to claim 1, wherein a thickness of the thermoplastic polyester elastomer film layer is 5-40 μm.

7. The speaker diaphragm according to claim 1, wherein the thermoplastic polyester elastomer film layer has a glass transition temperature of −90° C.-0° C.

8. The speaker diaphragm according to claim 1, wherein a thermoplastic polyester elastomer is a copolymer composed of a polyester hard segment A and a polyether or aliphatic polyester soft segment B; a mass percentage of the polyester hard segment A is 10-95%, and a relative molecular mass of the polyether or aliphatic polyester soft segment B is 600-6000.

9. The speaker diaphragm according to claim 1, wherein the polyether or aliphatic polyester soft segment B is selected from the group consisting of aliphatic polyester, polytetrahydrofuran ether, polyphenylene ether, and polyethylene oxide; and the polyester hard segment A comprises a polymer of dibasic acid and dihydric alcohol, wherein the dibasic acid is selected from the group consisting of terephthalic acid, isophthalic acid, naphthalenedicarboxylic acid and biphenyldicarboxylic acid, and the dihydric alcohol is selected from the group consisting of ethylene glycol, propylene glycol, butylene glycol, pentanediol, and hexylene glycol.

10. The speaker diaphragm according to claim 1, wherein the polyester hard segment A comprises a material that can be crystallized, an average polymerization degree of the polyester hard segment A material is greater than or equal to 2, and a melting temperature of the polyester hard segment A is greater than or equal to 150° C.

11. The speaker diaphragm according to claim 1, further comprising two surface layers compounded together and at least one intermediate layer located between the two surface layers, wherein at least one of the surface layers comprises the thermoplastic polyester elastomer film layer, and at least one of the intermediate layers comprises an adhesive layer.

12. The speaker diaphragm according to claim 11, wherein the speaker diaphragm comprises a three-layer structure, including one intermediate layer, and two surface layers being the thermoplastic polyester elastomer film layers.

13. The speaker diaphragm according to claim 11, wherein the speaker diaphragm comprises two intermediate layers, the two surface layers are the thermoplastic polyester elastomer film layers, and the two intermediate layers comprise adhesive layers of different materials.

14. The speaker diaphragm according to claim 11, wherein the speaker diaphragm comprises three intermediate layers, wherein a first and a second of the intermediate layers comprise adhesive layers and a third of the intermediate layers comprises the thermoplastic polyester elastomer film layer, and wherein the thermoplastic polyester elastomer film layer is located between the two adhesive layers.

15. A speaker, comprising a vibration system and a magnetic circuit system cooperating with the vibration system, wherein the vibration system comprises the speaker diaphragm according to claim 1.

16. The speaker diaphragm according to claim 11, wherein the speaker diaphragm comprises three intermediate layers, wherein the three intermediate layers comprise adhesive layers.

* * * * *